(12) United States Patent
Ermolaev et al.

(10) Patent No.: US 12,732,994 B2
(45) Date of Patent: Sep. 8, 2026

(54) RATE-MATCHING FOR TRANSPORT BLOCK PROCESSING OVER MULTIPLE SLOTS FOR PHYSICAL UPLINK SHARED CHANNEL

(71) Applicant: Intel Corporation, Santa Clara, CA (US)

(72) Inventors: Gregory Ermolaev, Santa Clara, CA (US); Gang Xiong, Portland, OR (US); Sergey Sosnin, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 18/558,158

(22) PCT Filed: Sep. 29, 2022

(86) PCT No.: PCT/US2022/045186
§ 371 (c)(1),
(2) Date: Oct. 30, 2023

(87) PCT Pub. No.: WO2023/055900
PCT Pub. Date: Apr. 6, 2023

(65) Prior Publication Data

US 2024/0224268 A1 Jul. 4, 2024

Related U.S. Application Data

(60) Provisional application No. 63/301,853, filed on Jan. 21, 2022, provisional application No. 63/256,910,
(Continued)

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0064* (2013.01); *H04L 1/0071* (2013.01); *H04W 72/0446* (2013.01); *H04W 72/21* (2023.01)

(58) Field of Classification Search
CPC ......... H04W 72/1268; H04W 72/0446; H04W 72/21; H04L 1/0041; H04L 1/0045;
(Continued)

(56) References Cited

U.S. PATENT DOCUMENTS

2021/0051636 A1 2/2021 Sengupta et al.
2021/0135787 A1 5/2021 Sengupta et al.
(Continued)

FOREIGN PATENT DOCUMENTS

JP 2024527221 7/2024
WO 2023055900 4/2023

OTHER PUBLICATIONS

Japanese Patent Office; Office Action dated Jan. 7, 2025 for Patent Application No. 2023-566843, 5 pages.
(Continued)

*Primary Examiner* — Rownak Islam
(74) *Attorney, Agent, or Firm* — Schwegman Lundberg & Woessner, P.A.

(57) ABSTRACT

Various embodiments herein provide techniques for uplink transport block transmission over multiple slots, e.g. using bit interleaving and/or rate matching. Other embodiments may be described and claimed.

16 Claims, 12 Drawing Sheets allocating slots for a user equipment (UE) to transmit a transport block over multiple slots, wherein the transport block corresponds to a physical uplink shared channel (PUSCH) transmission
1202 receiving the transport block in the allocated slots, wherein coded bits of the transport block are interleaved within individual slots of the allocated slots
1204

Related U.S. Application Data filed on Oct. 18, 2021, provisional application No. 63/250,950, filed on Sep. 30, 2021.

(51) Int. Cl.
*H04W 72/0446* (2023.01)
*H04W 72/21* (2023.01)

(58) Field of Classification Search
CPC ... H04L 1/0067; H04L 5/0048; H04L 5/0051; H04L 5/0057; H04L 5/0044; H04L 5/001; H04L 1/0064; H04L 1/0071
USPC .......................................................... 370/329
See application file for complete search history.

(56) References Cited

U.S. PATENT DOCUMENTS

| | | | | |
|---|---|---|---|---|
| 2021/0219329 | A1 | 7/2021 | Zhou et al. | |
| 2022/0346091 | A1* | 10/2022 | Karmoose | H04L 1/0072 |
| 2022/0385395 | A1* | 12/2022 | Sridharan | H04L 1/0013 |
| 2024/0163067 | A1* | 5/2024 | Xiong | H04L 5/0053 |
| 2024/0333428 | A1* | 10/2024 | Yamamoto | H04W 28/06 |

OTHER PUBLICATIONS

Ericsson, "TB Processing over Multi Slot PUSCH," 3GPP TSG RAN WG1 Meeting #106-e, R1-2107560, Aug. 16-27, 2021. 18 pages.
Huawei, HiSilicon, "Discussion on TB processing over multi-slot Pusch," 3GPP TSG RAN WG1 Meeting #106-e, R1-2106496, Aug. 16-27, 2021. 14 pages.
"Japanese Application Serial No. 2023-566843, Decision of Rejection mailed Jul. 1, 2025", w English Translation, 4 pgs.
"International Application Serial No. PCT US2022 045186, International Preliminary Report on Patentability mailed Apr. 11, 2024", 7 pgs.
"Japanese Application Serial No. 2023-566843, Response filed Apr. 7, 2025 to Notification of Reasons for Refusal mailed Jan. 7, 2025", W English Claims, 19 pgs.
International Patent Office—International Search Report and Written Opinion mailed Jan. 26, 2023 from International Patent Application No. PCT/US2022/045186, 10 pages.
Nokia, et al., "Final FL summary of TB processing over multi-slot PUSCH (AI 8.8.1.2)," 3GPP TSG RAN WG1 #106-e, R1-2108545, Agenda item: 8.8.1.2, Aug. 16-Aug. 27, 2021, e-Meeting, 152 pages.
Huawei, et al., "Discussion on TB processing over multi-slot PUSCH," 3GPP TSG RAN WG1 Meeting #106-e, R1-2106496, Agenda Item: 8.8.1.2, Aug. 16-27, 2021, E-meeting, 12 pages.
3GPP, "Technical Specification Group Radio Access Network; NR; Multiplexing and channel coding (Release 16)," 3GPP TS 38.212 V16.7.0 (Sep. 2021), 5G, 153 pages.

* cited by examiner

Coded bits of code block 2

Coded bits of code block 1

Interleavers

TBoMS slot

Figure 6

Coded bits of code block 2

Coded bits of code block 1

Interleavers

TBoMS slot

Figure 7 receiving an allocation of slots for transmission of a transport block over multiple slots, wherein the transport block corresponds to a physical uplink shared channel (PUSCH) transmission
1102 performing bit interleaving of the transport block within individual slots of the allocated slots
1104 allocating slots for a user equipment (UE) to transmit a transport block over multiple slots, wherein the transport block corresponds to a physical uplink shared channel (PUSCH) transmission
1202 receiving the transport block in the allocated slots, wherein coded bits of the transport block are interleaved within individual slots of the allocated slots
1204

RATE-MATCHING FOR TRANSPORT BLOCK PROCESSING OVER MULTIPLE SLOTS FOR PHYSICAL UPLINK SHARED CHANNEL

CROSS REFERENCE TO RELATED APPLICATION

The present application is a national phase entry under 35 U.S.C. § 371 of International Application No. PCT/US2022/045186, filed Sep. 29, 2022, entitled "RATE-MATCHING FOR TRANSPORT BLOCK PROCESSING OVER MULTIPLE SLOTS FOR PHYSICAL UPLINK SHARED CHANNEL," which claims priority to U.S. Provisional Patent Application No. 63/250,950, which was filed Sep. 30, 2021; U.S. Provisional Patent Application No. 63/256,910, which was filed Oct. 18, 2021; and to U.S. Provisional Patent Application No. 63/301,853, which was filed Jan. 21, 2022, the entire disclosures of which are hereby incorporated by reference.

FIELD

Various embodiments generally may relate to the field of wireless communications. For example, some embodiments may relate to techniques for transport block processing over multiple slots.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

For cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 illustrates an example of TB processing over multiple slots with bit interleaving per the whole TBoMS, in accordance with various embodiments.

FIG. 7 illustrates an example of TB processing over multiple slots with bit interleaving per the whole TBoMS, in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide mechanisms for TB processing over multiple slots, including rate matching and/or bit interleaving. For example, embodiments may include:

- Rate-matching mechanisms for TB processing over multiple slots with fixed bit selection starting position per each slot and continuous bit selection across slots.
- Rate-matching mechanisms for TB processing over multiple slots with bit interleaving per slot and per all slots allocated for the TBoMS transmission.

In NR, a transport block (TB) carried by a PUSCH is scheduled within a slot or resource allocation of one data transmission is confined with a slot. In this case, transport block size (TBS) is determined based on the number of resource elements (RE) in a slot. To maintain a low code rate, a transport block may span more than one slots, where a smaller number of physical resource blocks (PRBs) may be allocated in frequency so as to improve link budget for PUSCH transmission. In this case, transport block size (TBS) is determined based on the number of allocated slots for the TB processing over multiple slots (TBoMS). Following the same design principle for single-slot PUSCH repetition type A, same time domain resource allocation is allocated for each slot for TBoMS transmission.

Figure 1:
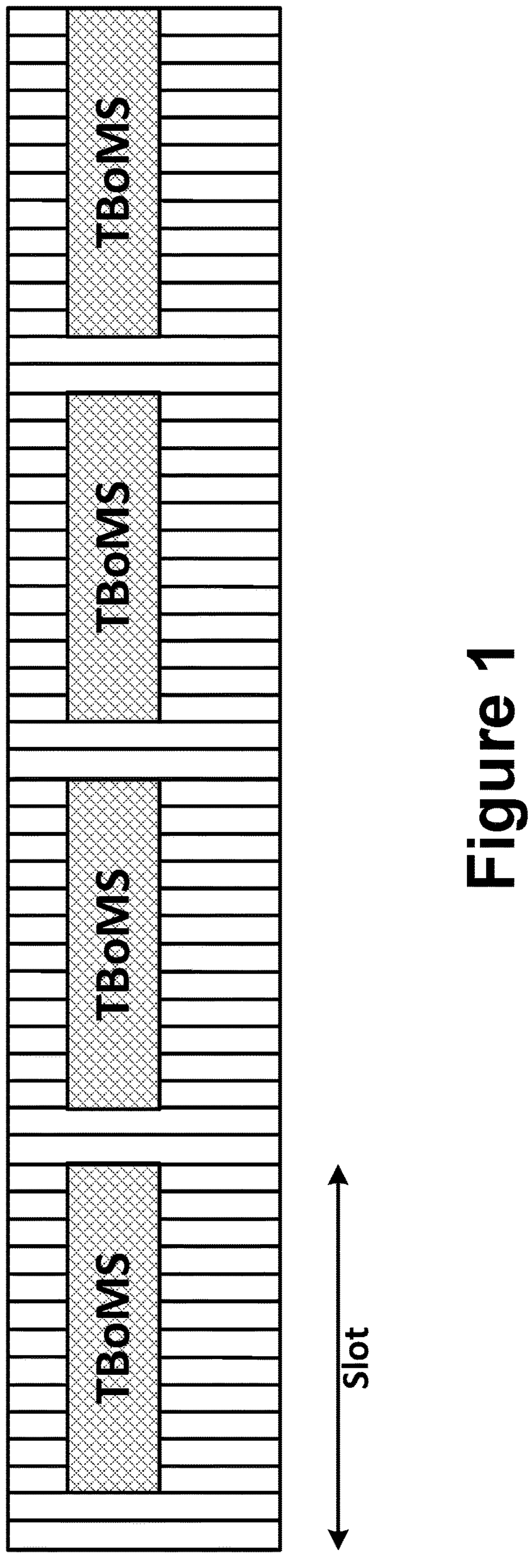
FIG. 1 illustrates an example of a physical uplink shared channel (PUSCH) with transport block (TB) processing over multiple slots (TBoMS), in accordance with various embodiments.

FIG. 1 illustrates one example of PUSCH with TB processing over multiple slots. In the example, 4 slots are allocated for TBoMS transmission, where same time domain resource allocation is allocated for each slot for TBoMS transmission.

In NR Rel-15, rate-matching that consists of two steps: bit selection and interleaving, is operated per slot basis. Further, to support the transmission of a TB processing over multiple slots (TBoMS), certain rate-matching mechanisms may need to be considered.

Embodiments for TB processing over multiple slots, e.g., including rate matching and/or bit interleaving, are described further below.

Rate-Matching Mechanism for TB Processing Over Multiple Slots with Bit Interleaving Per Slot In one embodiment, the bit interleaving is performed per slot basis. In particular, the coded bits for each code block are first divided into multiple segments based on the number of slots allocated for TBoMS transmission. Further, interleaving is applied for each code block segment. If more than one code blocks are carried by TBoMS transmission, code block segments for different code blocks are concatenated and mapped into each slot allocated for TBoMS transmission.

Figure 2:
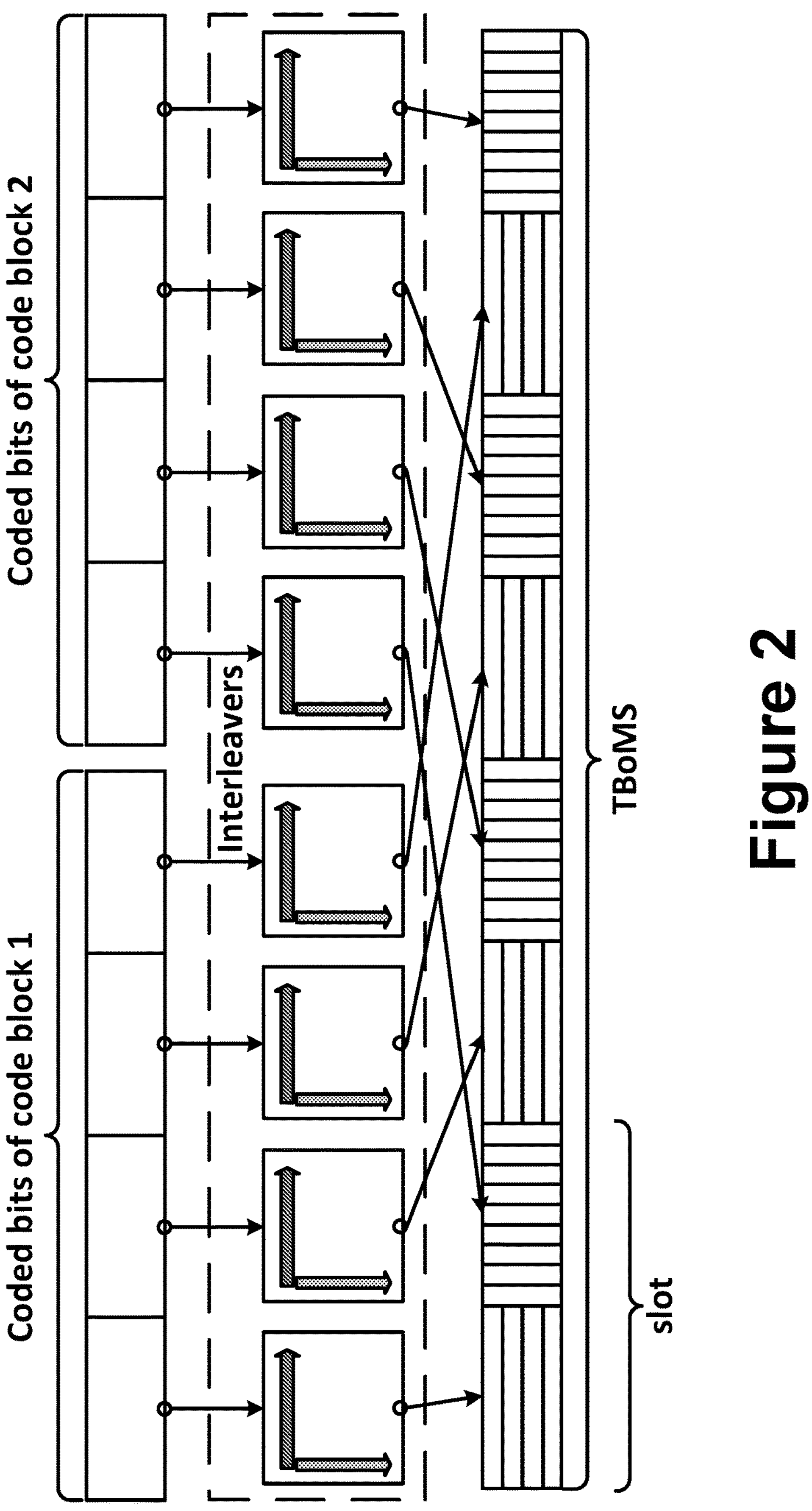
FIG. 2 illustrates an example of TB processing over multiple slots with bit interleaving per slot, in accordance with various embodiments.

FIG. 2 illustrates one example of TB processing over multiple slots with bit interleaving per slot. In the example, 4 slots are allocated for TBoMS transmission. Further, the bits sequence of each code block that is selected for the whole TBoMS transmission is divided into four parts that corresponds to the four slots of TBoMS transmission. Each bit sequence part is independently interleaved. Then, after concatenation of the corresponding parts of all code blocks, the resulting sequence is mapped to corresponding slot.

In one embodiment, starting position of coded bits for bit selection for each slot is pre-determined in circular buffer of each code block. In particular, the starting position is determined in accordance with the number of slots allocated for TBoMS transmission and size of rate-matching output. In this case, the starting position of coded bits for each slot can be given by $$i \cdot E_r / N_{slots}^{TBoMS},$$

where i is the available slot index for TBoMS, $E_r$ is the rate-matching size for code block r and $$N_{slots}^{TBoMS}$$

is the number of allocated slots for TBoMS transmission.

Figure 3:
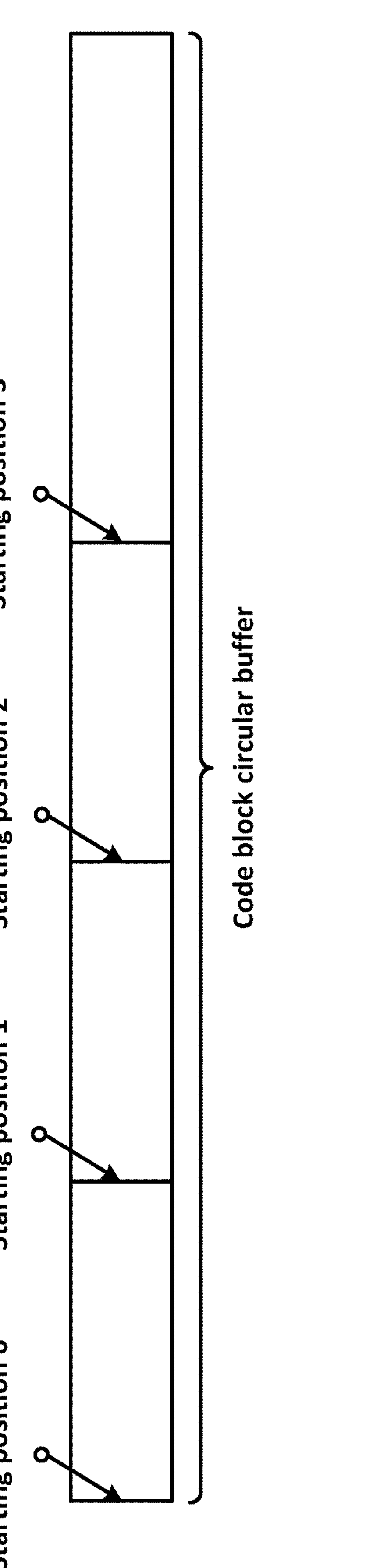
FIG. 3 illustrates an example distribution of starting positions with fixed offset for bit-selection, in accordance with various embodiments.

FIG. 3 illustrates one example of starting position distribution with fixed offset for bit-selection. In the example, four slots are allocated for TBoMS transmission. In this case, distance between starting positions of code block segments for each slot of TBoMS transmission is fixed.

Note that the above option can be applied for the case when part of coded bits in code block is dropped when a TBoMS transmission overlaps with a physical uplink control channel (PUCCH) carrying uplink control channel (UCI) and when the UCI is multiplexed on the TBoMS in the overlapped slot. In other words, the starting positions do not depend on whether some or all the coded bits in a slot are dropped.

Figure 4:
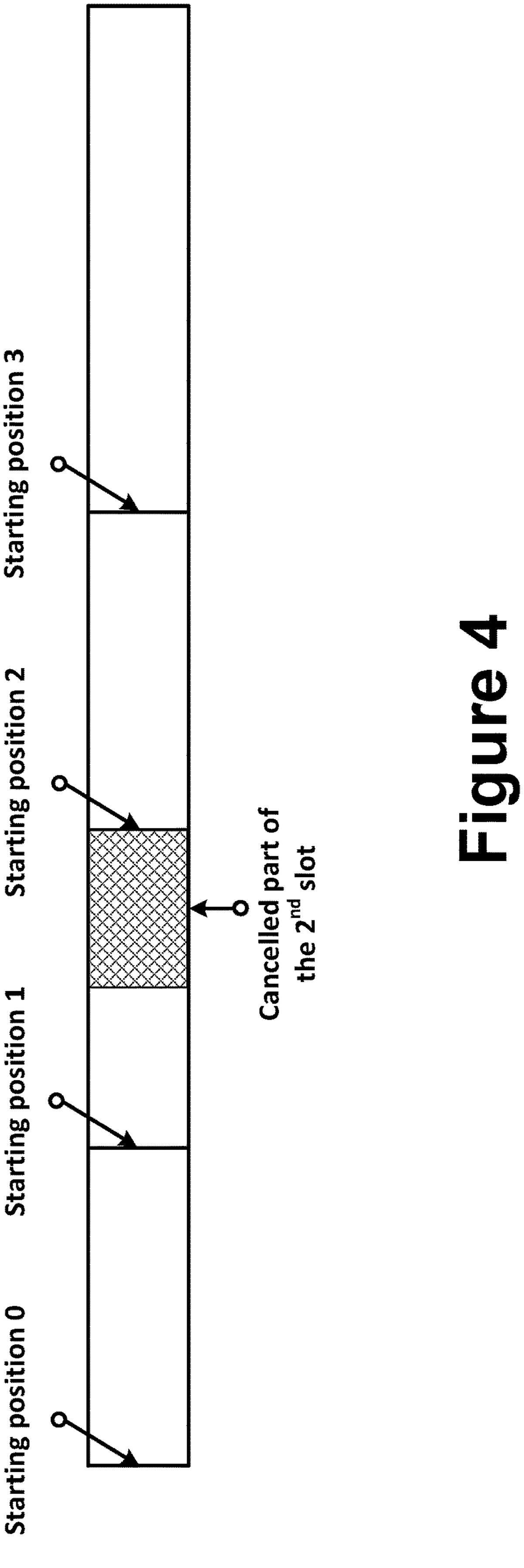
FIG. 4 illustrates an example of starting positions distribution for bit-selection with fixed offset in case of cancellation, in accordance with various embodiments.

FIG. 4 illustrates one example of starting position distribution with fixed offset for bit-selection in case of cancellation of some coded bits in a slot. In the example, the starting positions are determined regardless of cancellation of some of the encoded bits in the $2^{nd}$ slot allocated for TBoMS transmission.

An example update of 3GPP Technical Standard (TS) 38.212, V16.6.0 ("NR: Multiplexing and channel coding") [1] in Section 6.2.5 and Section 6.2.6 for rate-matching and code block concatenation of TBoMS with bit interleaving per slot and starting positions distribution for bit selection with fixed offset is presented below.

6.2.5 Rate Matching

Coded bits for each code block, denoted as $d_{r0}, d_{r1}, d_{r2}, d_{r3}, \ldots, d_{r(N_r-1)}$, are delivered to the rate match block, where r is the code block number, and $N_r$ is the number of encoded bits in code block number r. The total number of code blocks is denoted by C and bit selection procedure is performed for each code block individually according to Clause 5.4.2.1 by setting $I_{LBRM}$=1 if higher layer parameter rateMatching is set to limitedBufferRM and by setting $I_{LRBM}$=0 otherwise.

After bit selection, the bits are denoted by $e_{r0}, e_{r1}, e_{r2}, \ldots, e_{r(E_r-1)}$, where $E_r$ is the number of selected bits for code block number r for all slots of the TBoMS transmission.

Denote by $$N_{slots}^{TBoMS}$$

the number of slots allocated for the TBoMS transmission. The selected bits sequences $$e_{r0}^s, e_{r1}^s, e_{r2}^s, \ldots, e_{r(E_r^s-1)}^s$$

for the slots s $$(s = 0, 1, \ldots, N_{slots}^{TBoMS} - 1)$$

are generated as follows, where $$E_r^s$$

is the number of bits available for the code block in slot s:

--- s = 0;

while $s < N_{slots}^{TBoMS}$ k = 0;

-continued $j = s^{*} E_r / N_{slots}^{TBoMS}$, while $k < E_r^s$ $e_{rk}^s = e_{rj}$;

k = k + 1;
j = j + 1;
end while
s = s + 1
end while

After bit selection, for each slot, the interleaved bits $$f_{r0}^s, f_{r1}^s, f_{r2}^s, \ldots, f_{r(E_r^s-1)}^s$$

are generated from $$e_{r0}^s, e_{r1}^s, e_{r2}^s, \ldots, e_{r(E_r^s-1)}^s$$

as described in Clause 5.4.2.2, where $$E = E_r^s.$$

6.2.6 Code Block Concatenation

The input bit sequence for the code block concatenation block are the sequences $$f_{r0}^s, f_{r1}^s, f_{r2}^s, \ldots, f_{r(E_r^s-1)}^s,$$

for r=0, . . . , C−1 and where $$E_r^s$$

is the number of rate matched bits for the r-th code block for slot s.

Code block concatenation is performed according to Clause 5.5.

The bits after code block concatenation are denoted by $$g_0^s, g_1^s, g_2^s, \ldots, g_{(G^s-1)}^s,$$

where $G^s$ is the total number of coded bits for transmission in slot s.

Note that in the above example of the TS38.212 update, bit selection of the bits for the whole TBoMS is done per code block according to Clause 5.4.2.1. Thus, the above text provides an example of procedure for each slot that is additional to conventional bit selection procedure to make the whole procedure work for both single slot PUSCH transmission and TBoMS.

In another example of this embodiment, the bit selection for each slot is performed immediately in Clause 5.4.2.1. Thus, for case when TBoMS is enabled, the G is initialized by the total number of coded bits for transmission in a slot of TBoMS.

An example update to Section 5.4.2.1 of TS38.212 [1] for bit selection of TBoMS is presented below. Note that this example can be used for any bit interleaving option and starting bit position determination presented herein.

5.4.2.1 Bit Selection 5.4.2.1 Bit selection
---------------------omitted text---------------------

Denote by $rv_{id}$ the redundancy version number for this transmission ($rv_{id}$=0, 1, 2 or 3), the rate matching output bit sequence $e_k$, k=0, 1, 2, . . . , E−1, is generated as follows, where $k_0$ is given by Table 5.4.2.1-2 according to the value of $rv_{id}$ and LDPC base graph if TBoMS is not enabled or for the first slot of TBoMS transmission if TBoMS is enabled, otherwise $k_0$ is continuous from the last selected bit for the previous slot of TBoMS transmission in a such manner that filler bits are not accounted in the calculation of $k_0$:

k = 0 ;
j = 0 ;
while $k < E$
  if $d_{(k_0 + j) mod N_{cb}} \neq$ <NULL>
    $e_k = d_{(k_0 + j) mod N_{cb}}$ ;
    k = k + 1 ;
  end if
  j = j + 1 ;
end while
---------------------omitted text---------------------

In another embodiment, the bit selection is performed in a continuous manner. Note that the starting position for the encoded bits in each slot for TBoMS transmission depends on the number of coded bits that are selected for previous slots. In case when some or part of encoded bits are dropped in a slot, the starting position for the next slot is determined based on the number of rate-matched bits in the slot.

Note that this may apply for the case when part of coded bits in code block is dropped when a TBoMS transmission overlaps with a PUCCH carrying UCI and UCI is multiplexed on the TBoMS in the overlapped slot.

In addition, this may also apply for the case when TBoMS transmission in a slot is dropped due to collision with UL/DL configured indicated by dynamic slot format indication (SFI), uplink cancellation indication (CI), or higher priority uplink transmission.

In another option, when TBoMS transmission in a slot is dropped due to collision with UL/DL configured indicated by dynamic slot format indication (SFI), uplink cancellation indication (CI), or higher priority uplink transmission, the starting position of the coded bits in each slot for TBoMS transmission is pre-determined based on the number of allocated slots and rate-matching size of TBoMS transmission as mentioned above. In other words, this does not depend on the case when TBoMS is dropped due to collision with UL/DL configured indicated by dynamic SFI, uplink CI, or higher priority uplink transmission.

Figure 5:
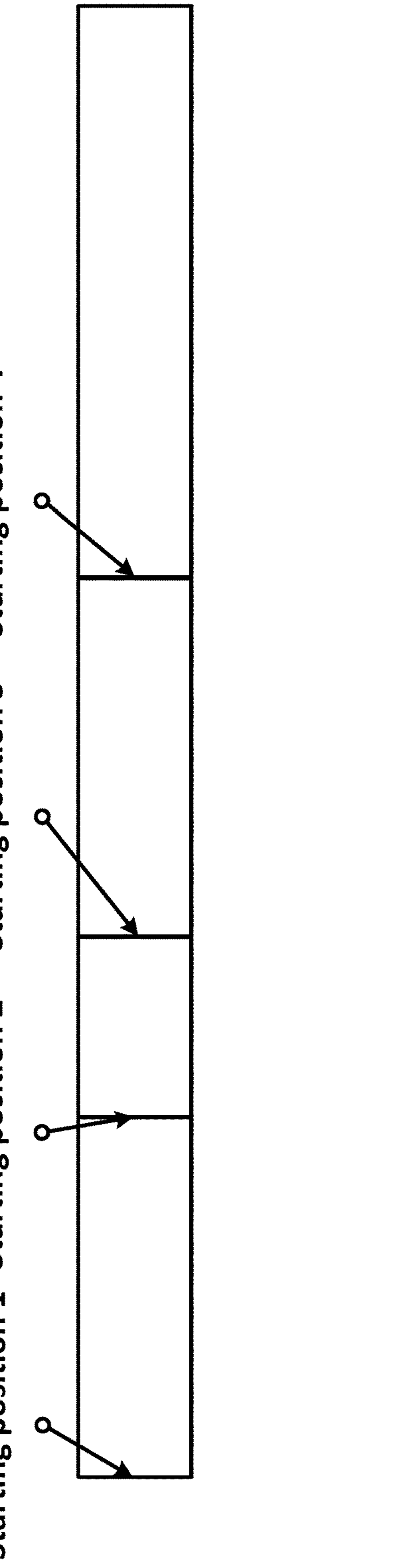
FIG. 5 illustrates an example of continuous bit selection for starting position distribution in case of cancellation, in accordance with various embodiments.

FIG. 5 illustrates one example of continuous bit selection for starting positions distribution in case of cancellation. In the example, some of coded bits are dropped due to the UCI multiplexing on the TBoMS in the $2^{nd}$ slot. Further, the starting position in $3^{rd}$ slot is determined based on the starting position in $2^{nd}$ slot and the number of rate-matched bits in $2^{nd}$ slot. In this case, the encoded bits are continuously selected for the TBoMS transmission.

An example update of TS38.212 in Section 6.2.5 and Section 6.2.6 [1] for rate-matching and code block concatenation of TBoMS with bit interleaving per slot and continuous bit selection starting positions distribution is presented below.

6.2.5 Rate Matching

Coded bits for each code block, denoted as $d_{r0}$, $d_{r1}$, $d_{r2}$, $d_{r3}$, . . . , $d_{r(N_r-1)}$ are delivered to the rate match block, where r is the code block number, and $N_r$ is the number of encoded bits in code block number r. The total number of code blocks is denoted by C and bit selection procedure is performed for each code block individually according to Clause 5.4.2.1 by setting $I_{LBRM}$=1 if higher layer parameter rateMatching is set to limitedBufferRM and by setting $I_{LBRM}$=0 otherwise.

After bit selection, the bits are denoted by $e_{r0}$, $e_{r1}$, $e_{r2}$, . . . , $e_{r(E_r-1)}$, where $E_r$ is the number of selected bits for code block number r for all slots of the TBoMS transmission.

Denote by $$N_{slots}^{TBoMs}$$

the number of slots allocated for the TBoMS transmission. The selected bits sequences $$e_{r0}^s, e_{r1}^s, e_{r2}^s, \ldots, e_{r(E_r^s-1)}^s$$

for the slots s $$\left(s = 0, 1, \ldots, N_{slots}^{TBoMs} - 1\right)$$

are generated as follows, where $$E_r^s$$

is the number of bits available for the code block in slot s:

```
s = 0;
j = 0;
while s < N_slots^TBoMS
k = 0;
while k < E_r^s
  e_rk^s = e_rj;
  k = k + 1;
  j = j + 1;
end while
s = s + 1;
end while
```

After bit selection, for each slot, the interleaved bits $$f_{r0}^s, f_{r1}^s, f_{r2}^s, \ldots, f_{r(E_r^s-1)}^s$$

are generated from $$e_{r0}^s, e_{r1}^s, e_{r2}^s, \ldots, e_{r(E_r^s-1)}^s$$

as described in Clause 5.4.2.2, where $$E = E_r^s.$$

6.2.6 Code Block Concatenation

The input bit sequence for the code block concatenation block are the sequences $$f_{r0}^s, f_{r1}^s, f_{r2}^s, \ldots, f_{r(E_r^s-1)}^s,$$

for r=0, . . . , C−1 and where $$E_r^s$$

is the number of rate matched bits for the r-th code block for slot s.

Code block concatenation is performed according to Clause 5.5.

The bits after code block concatenation are denoted by $$g_0^s, g_1^s, g_2^s, \ldots, g_{(G^s-1)}^s,$$

where $G^s$ is the total number of coded bits for transmission in slot s.

In another embodiment, whether starting position of coded bits in each slot is determined based on predefined starting position or determined based on the actual number of bits which are transmitted in previous slots may depend on whether semi-static or dynamic UCI is multiplexed on a TBoMS transmission with or without an associated DCI.

Note that in the above option, semi-static UCI may include semi-persistent HARQ-ACK feedback in response to a SPS PDSCH without associated DCI, scheduling request (SR), periodic channel state information (P-CSI), and/or semi-persistent CSI (SP-CSI). In addition, dynamic UCI may include dynamic HARQ-ACK feedback in response to PDSCH with associated DCI, HARQ-ACK feedback for HARQ-ACK for the first SPS PDSCH associated with the activation DCI, and/or HARQ-ACK corresponding to the SPS Release DCI.

Further, TBoMS transmission with an associated DCI may include dynamic grant TBoMS (DG-TBoMS) and/or Type 1 configured grant TBoMS (CG-TBoMS) associated with activation DCI. In addition, TBoMS transmission without an associated DCI may include Type 1 CG-TBoMS other than first transmission, and Type 2 CG-TBoMS In one option, when semi-static UCI is multiplexed on a TBoMS transmission without an associated DCI, the coded bits are continuously mapped to the allocated resource for TBoMS transmission. In other words, starting position of coded bits in each slot is determined based on the actual number of bits which are transmitted in previous slots. Note that for this option, the timeline requirement for UCI multiplexing is not needed.

In another option, when semi-static UCI is multiplexed on a TBoMS transmission without an associated DCI, and/or when the UCI is multiplexed on the TBoMS transmission in the first allocated slot, the coded bits are continuously mapped to the allocated resource for TBoMS transmission. In other words, starting position of coded bits in each slot is determined based on the actual number of bits which are transmitted in previous slots.

In another option, when semi-static UCI is multiplexed on a TBoMS transmission with an associated DCI, or when dynamic UCI is multiplexed on a TBoMS transmission with and without an associated DCI, starting position of coded bits in each slot is determined based on predefined starting position as mentioned above. In other words, the coded bits are not continuously mapped to the allocated resource for TBoMS transmission, and the starting position is predetermined regardless of the number of actually transmitted bits in each slot.

In another option, when semi-static UCI is multiplexed on a TBoMS transmission with an associated DCI, or when dynamic UCI is multiplexed on a TBoMS transmission with and without an associated DCI, and when the UCI is multiplexed on the TBoMS transmission in the first allocated slot, the coded bits are continuously mapped to the allocated resource for TBoMS transmission. In other words, starting position of coded bits in each slot is determined based on the actual number of bits which are transmitted in previous slots.

Rate-Matching Mechanism for TBoMS with Bit Interleaving Per all Slots Allocated for the TBoMS Transmission Embodiments of rate-matching mechanism for TBoMS with bit interleaving per all slots allocated for the TBoMS transmission are described further below.

In one embodiment, bit interleaving is performed per all slots allocated for the TBoMS with code blocks mapping to each slot. In particular, the encoded bits for each code block are firstly interleaved. Further, the rate-matched sequence for each code block is divided into multiple segments in each slot. Then, after concatenation of the corresponding parts of all code blocks, the resulting sequence is mapped to corresponding slot.

Figure 6:
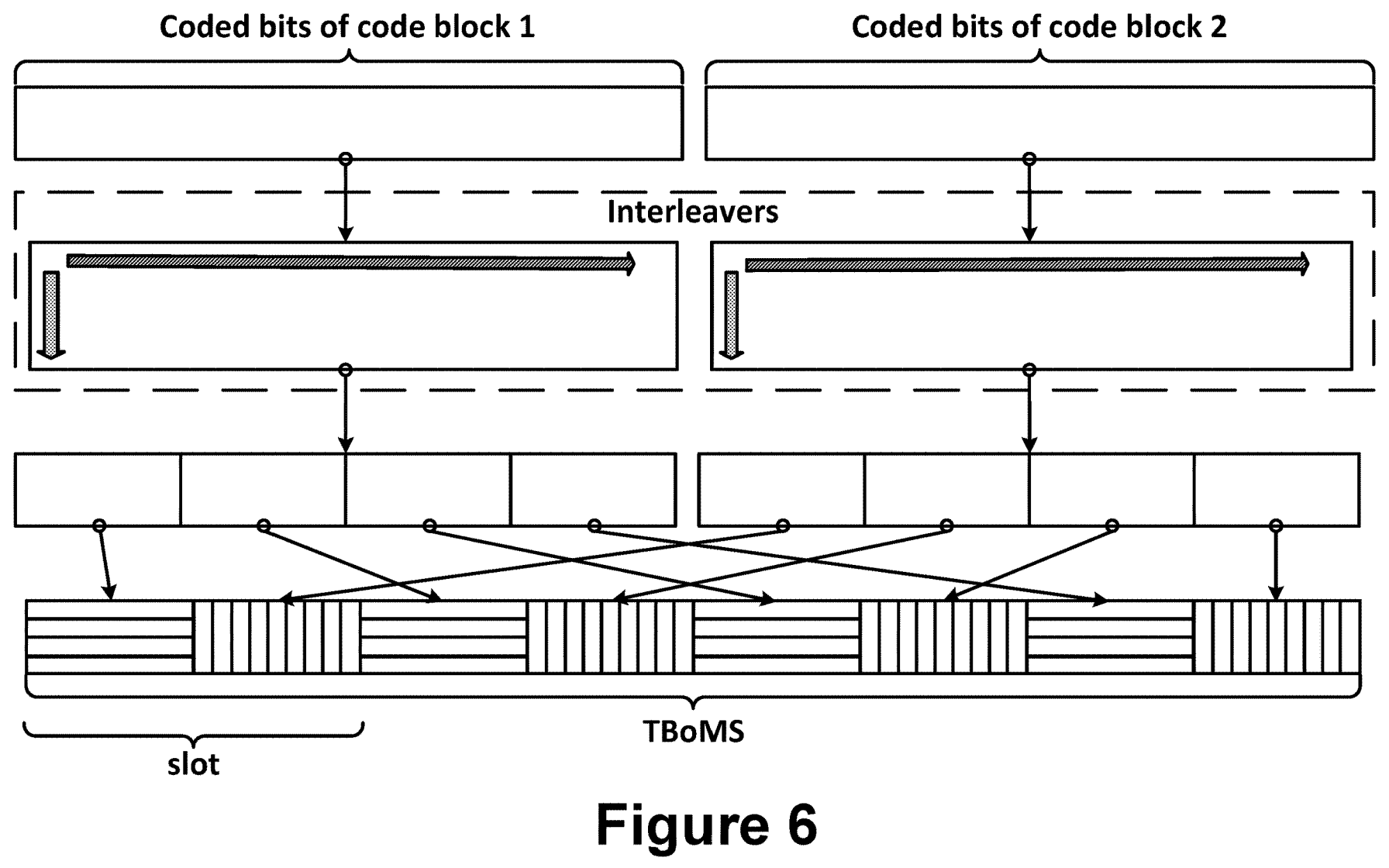

FIG. 6 illustrates one example of TB processing over multiple slots with bit interleaving per the whole TBoMS with code blocks mapping to each slot. In the example, 4 slots are allocated for TBoMS transmission. Further, the bits sequence of each code block that is selected for the whole TBoMS transmission is interleaved. The rate-matched sequence of each code block is divided into four parts that corresponds to the four slots of TBoMS transmission. Then, after concatenation of the corresponding parts of all code blocks, the resulting sequence is mapped to corresponding slot.

Note that the same options for the starting positions distribution for bit-selection as mentioned above can be used with bit interleaving per the whole TBoMS with code blocks mapping to each slot.

In one example, an update to TS38.212 in Section 6.2.5 and Section 6.2.6 [1] for rate-matching and concatenation of TBoMS with bit interleaving per all slots allocated for the TBoMS transmission, code blocks mapping to each slot and starting positions distribution for bit selection with fixed offset is presented below.

6.2.5 Rate Matching

Coded bits for each code block, denoted as $d_{r0}$, $d_{r1}$, $d_{r2}$, $d_{r3}$, . . . , $d_{r(N_r-1)}$, are delivered to the rate match block, where r is the code block number, and $N_r$ is the number of encoded bits in code block number r. The total number of code blocks is denoted by C and each code block is individually rate matched according to Clause 5.4.2 by setting $I_{LRBM}$=1 if higher layer parameter rateMatching is set to limitedBufferRM and by setting $I_{LRBM}$=0 otherwise. After rate matching, the bits are denoted by $f_{r0}$, $f_{r1}$, $f_{r2}$, $f_{r3}$, . . . , $f_{r(E_r-1)}$, where $E_r$ is the number of rate matched bits for code block number r.

Denote by $$N_{slots}^{TBoMs}$$

the number of slots allocated for the TBoMS transmission. The selected bits sequences $$f_{r0}^s, f_{r1}^s, f_{r2}^s, \dots, f_{r(E_r^s-1)}^s$$

for each slot s $$(s = 0, 1, \dots, N_{slots}^{TBoMs} - 1)$$

are generated as follows, where $$E_r^s$$

is the number of bits available for the code block in slot s:

```
s = 0;
while s < N_slots^TBoMS
    k = 0;
    j = s*E_r/N_slots^TBoMS;
    while k < E_r^s
        f_rk^s = f_rj;
        k = k + 1;
        j = j + 1;
    end while
    s = s + 1;
end while
```

6.2.6 Code Block Concatenation

The input bit sequence for the code block concatenation block are the sequences $$f_{r0}^s, f_{r1}^s, f_{r2}^s, \ldots, f_{r(E_r^s-1)}^s,$$

for r=0, . . . , C−1 and where $$E_r^s$$

is the number of rate matched bits for the r-th code block for slot s.

Code block concatenation is performed according to Clause 5.5.

The bits after code block concatenation are denoted by $$g_0^s, g_1^s, g_2^s, \ldots, g_{G^s-1}^s,$$

where $G^s$ is the total number of coded bits for transmission in slot s.

Another example update to TS38.212 in Section 6.2.5 and Section 6.2.6 [1] for rate-matching and concatenation of TBoMS with bit interleaving per all slots allocated for the TBoMS transmission, code blocks mapping to each slot and continuous bit selection starting positions distribution is presented below.

6.2.5 Rate Matching

Coded bits for each code block, denoted as $d_{r0}$, $d_{r1}$, $d_{r2}$, $d_{r3}$, . . . , $d_{r(N_r-1)}$, are delivered to the rate match block, where r is the code block number, and $N_r$ is the number of encoded bits in code block number r. The total number of code blocks is denoted by C and each code block is individually rate matched according to Clause 5.4.2 by setting $I_{LBRM}$=1 if higher layer parameter rateMatching is set to limitedBufferRM and by setting $I_{LRBM}$=0 otherwise. After rate matching, the bits are denoted by $f_{r0}$, $f_{r1}$, $f_{r2}$, $f_{r3}$, . . . , $f_{r(E_r-1)}$, where $E_r$ is the number of rate matched bits for code block number r.

Denote by $$N_{slots}^{TBoMS}$$

the number of slots allocated for the TBoMS transmission. The selected bits sequences $$f_{r0}^s, f_{r1}^s, f_{r2}^s, \ldots, f_{r(E_r^s-1)}^s$$

for each slot s $$(s = 0, 1, \ldots, N_{slots}^{TBoMS} - 1)$$

are generated as follows, where $$E_r^s$$

is the number of bits available for the code block in slot s:

```
j = 0;
s = 0;
while s < N_slots^TBoMS
k = 0;
while k < E_r^s
  f_rk^s = f_rj;
    k = k + 1;
    j = j + 1;
end while
s = s + 1;
end while
```

6.2.6 Code Block Concatenation

The input bit sequence for the code block concatenation block are the sequences $$f_{r0}^s, f_{r1}^s, f_{r2}^s, \ldots, f_{r(E_r^s-1)}^s,$$

for r=0, . . . , C−1 and where $$E_r^s$$

is the number of rate matched bits for the r-th code block for slot s.

Code block concatenation is performed according to Clause 5.5.

The bits after code block concatenation are denoted by $$g_0^s, g_1^s, g_2^s, \ldots, g_{G^s-1}^s,$$

where $G^S$ is the total number of coded bits for transmission in slot s.

In another embodiment, bit interleaving is performed per all slots allocated for the TBoMS with continuous code blocks mapping into the whole TBoMS transmission. In particular, the encoded bits for each code block are firstly interleaved. Further, the rate-matched sequences of all code blocks are continuously concatenated. Then, after division of concatenated bits into multiple segments in each slot, the resulting sequence is mapped to corresponding slot.

Figure 7:
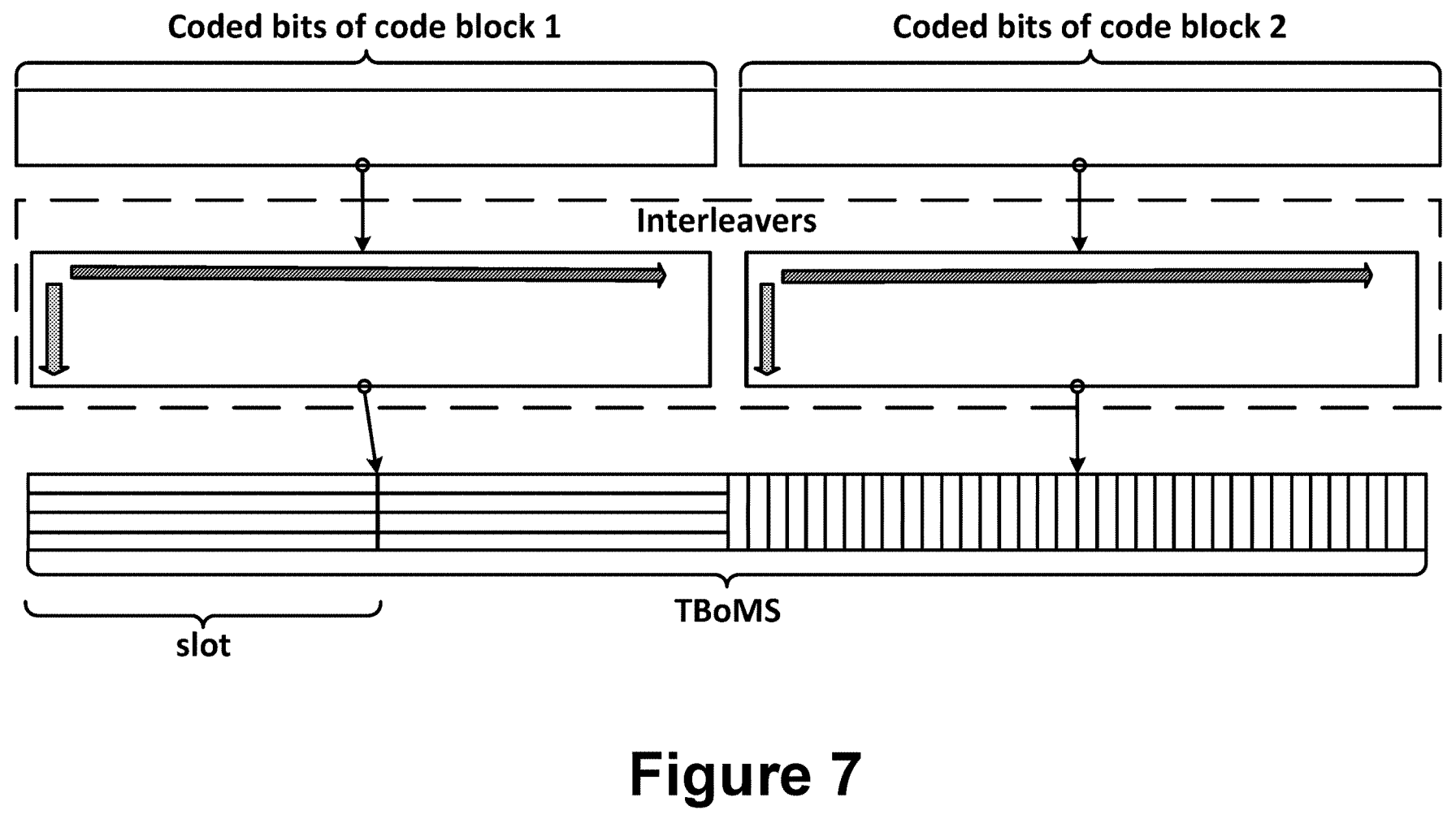

FIG. 7 illustrates one example of TB processing over multiple slots with bit interleaving per the whole TBoMS with continuous code blocks mapping into the whole TBoMS transmission. In the example, 4 slots are allocated for TBoMS transmission. Further, the bits sequence of each code block that is selected for the whole TBoMS transmission is interleaved. The rate-matched sequences of all code blocks are continuously concatenated. Then, after division of the concatenated bits into four parts that corresponds to the four slots of TBoMS transmission, the resulting sequence is mapped to corresponding slot.

Note that the same options for the starting positions distribution for bit-selection as mentioned above can be used with bit interleaving per the whole TBoMS with continuous code blocks mapping into the whole TBoMS transmission with exception that division is made after concatenation of code blocks. Therefore, for starting positions distribution for bit selection with fixed offset, the starting position of coded bits for each slot can be given by $$i \cdot G/N_{slots}^{TBoMS},$$

where i is the available slot index for TBoMS, G is the total number of coded bits for TBoMS transmission and $$N_{slots}^{TBoMS}$$

is the number of allocated slots for TBoMS transmission.

In accordance with one example, an update to 3GPP TS38.212 in Section 6.2.5 and Section 6.2.6 [1] for rate-matching and concatenation of TBoMS with bit interleaving per all slots allocated for the TBoMS transmission, continuous code blocks mapping into the whole TBoMS transmission and starting positions distribution for bit selection with fixed offset is presented below.

6.2.5 Rate Matching

Coded bits for each code block, denoted as $d_{r0}, d_{r1}, d_{r2}, d_{r3}, \ldots, d_{r(N_r-1)}$, are delivered to the rate match block, where r is the code block number, and $N_r$ is the number of encoded bits in code block number r. The total number of code blocks is denoted by C and each code block is individually rate matched according to Clause 5.4.2 by setting $I_{LBRM}=1$ if higher layer parameter rateMatching is set to limitedBufferRM and by setting $I_{LRBM}=0$ otherwise. After rate matching, the bits are denoted by $f_{r0}, f_{r1}, f_{r2}, f_{r3}, \ldots, f_{r(E_r-1)}$, where $E_r$ is the number of rate matched bits for code block number r.

6.2.6 Code Block Concatenation

The input bit sequence for the code block concatenation block are the sequences $f_{r0}, f_{r1}, f_{r2}, f_{r3}, \ldots, f_{r(E_r-1)}$, for $r=0, \ldots, C-1$ and where $E_r$ is the number of rate matched bits for the r-th code block.

Code block concatenation is performed according to Clause 5.5.

The bits after code block concatenation are denoted by $g_0, g_1, g_2, g_3, \ldots, g_{G-1}$, where G is the total number of coded bits for transmission.

Denote by $$N_{slots}^{TBoMS}$$

the number of slots allocated for the TBoMS transmission. The selected bits sequences $$g_0^s, g_1^s, g_2^s, \ldots, g_{G^s-1}^s$$

for each slot s $$(s = 0, 1, \ldots, N_{slots}^{TBoMS} - 1)$$

are generated as follows, where $G_s$ is the number of bits available for slot s:

```
s = 0;
while s < N_slots^TBoMS
    k = 0;
    j = s* G/N_slots^TBoMS;
    while k < G_S
        g_k^s = g_j;
        k = k + 1;
      j = j + 1;
   end while
     s = s + 1;
end while
```

In accordance with another example, an update to TS38.212 in Section 6.2.5 and Section 6.2.6 [1] for rate-matching and concatenation of TBoMS with bit interleaving per all slots allocated for the TBoMS transmission, continuous code blocks mapping into the whole TBoMS transmission and continuous bit selection starting positions distribution is presented below.

6.2.5 Rate Matching

Coded bits for each code block, denoted as $d_{r0}, d_{r1}, d_{r2}, d_{r3}, \ldots, d_{r(N_r-1)}$, are delivered to the rate match block, where r is the code block number, and $N_r$ is the number of encoded bits in code block number r. The total number of code blocks is denoted by C and each code block is individually rate matched according to Clause 5.4.2 by setting $I_{LBRM}=1$ if higher layer parameter rateMatching is set to limitedBufferRM and by setting $I_{LRBM}=0$ otherwise. After rate matching, the bits are denoted by $f_{r0}, f_{r1}, f_{r2}, f_{r3}, \ldots, f_{r(E_r-1)}$, where $E_r$ is the number of rate matched bits for code block number r.

6.2.6 Code Block Concatenation

The input bit sequence for the code block concatenation block are the sequences $f_{r0}, f_{r1}, f_{r2}, f_{r3}, \ldots, f_{r(E_r-1)}$, for $r=0, \ldots, C-1$ and where $E_r$ is the number of rate matched bits for the r-th code block.

Code block concatenation is performed according to Clause 5.5.

The bits after code block concatenation are denoted by $g_0, g_1, g_2, g_3, \ldots, g_{G-1}$, where G is the total number of coded bits for transmission.

Denote by $$N_{slots}^{TBoMS}$$

the number of slots allocated for the TBoMS transmission. The selected bits sequences $$g_0^s, g_1^s, g_2^s, \ldots, g_{G^s-1}^s$$

for each slot s $$\left(s = 0, 1, \ldots, N_{slots}^{TBoMS} - 1\right)$$

are generated as follows, where $G_s$ is the number of bits available for slot s:

```
j = 0;
  s = 0;
while s < N_slots^TBoMS
   k = 0;
   while k < G_S
      g_k^s = g_j;
         k = k + 1;
      j = j + 1;
   end while
      s = s + 1;
end while
```

Systems and Implementations

Figure 8:
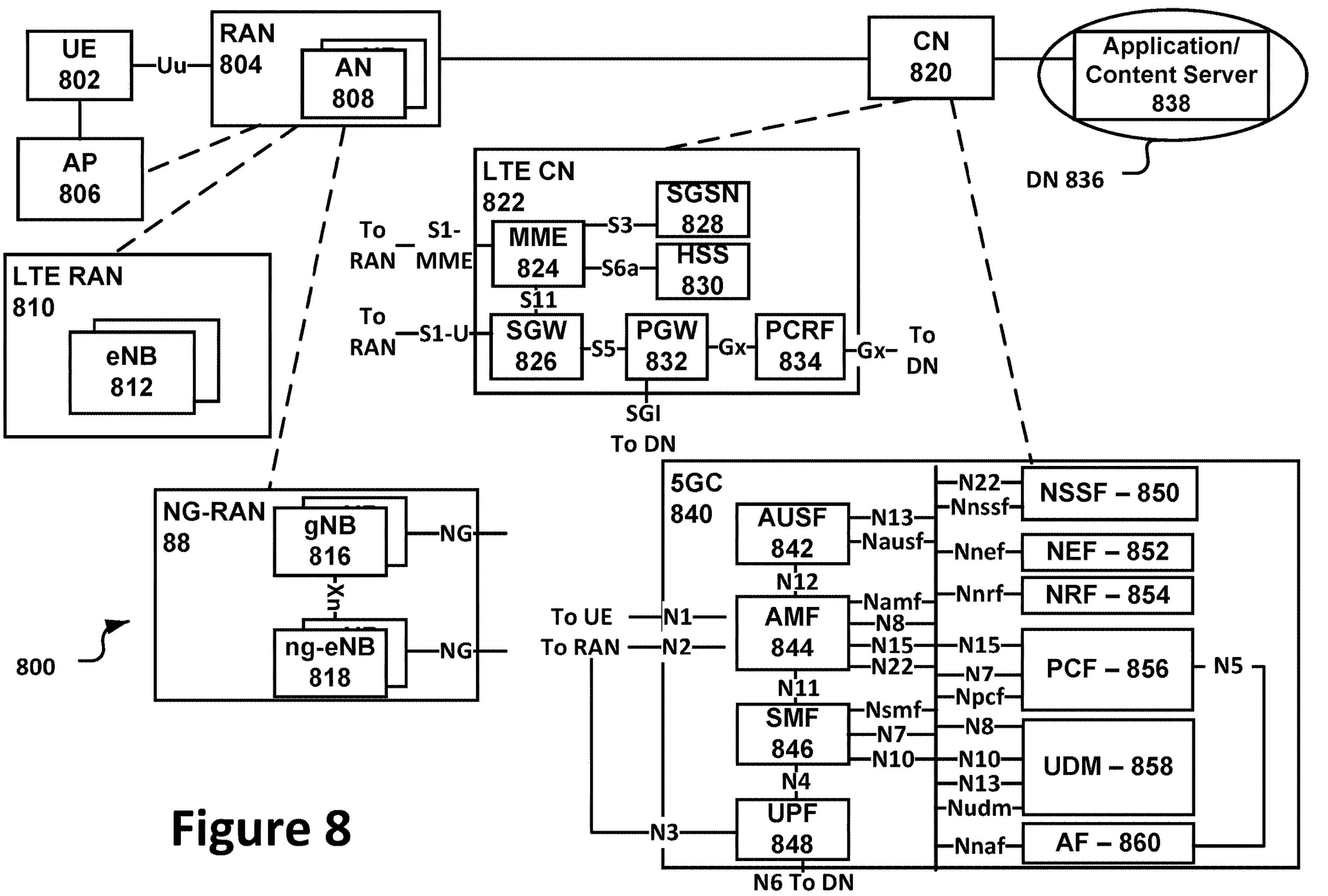
FIG. 8 schematically illustrates a wireless network in accordance with various embodiments.
Figure 9:
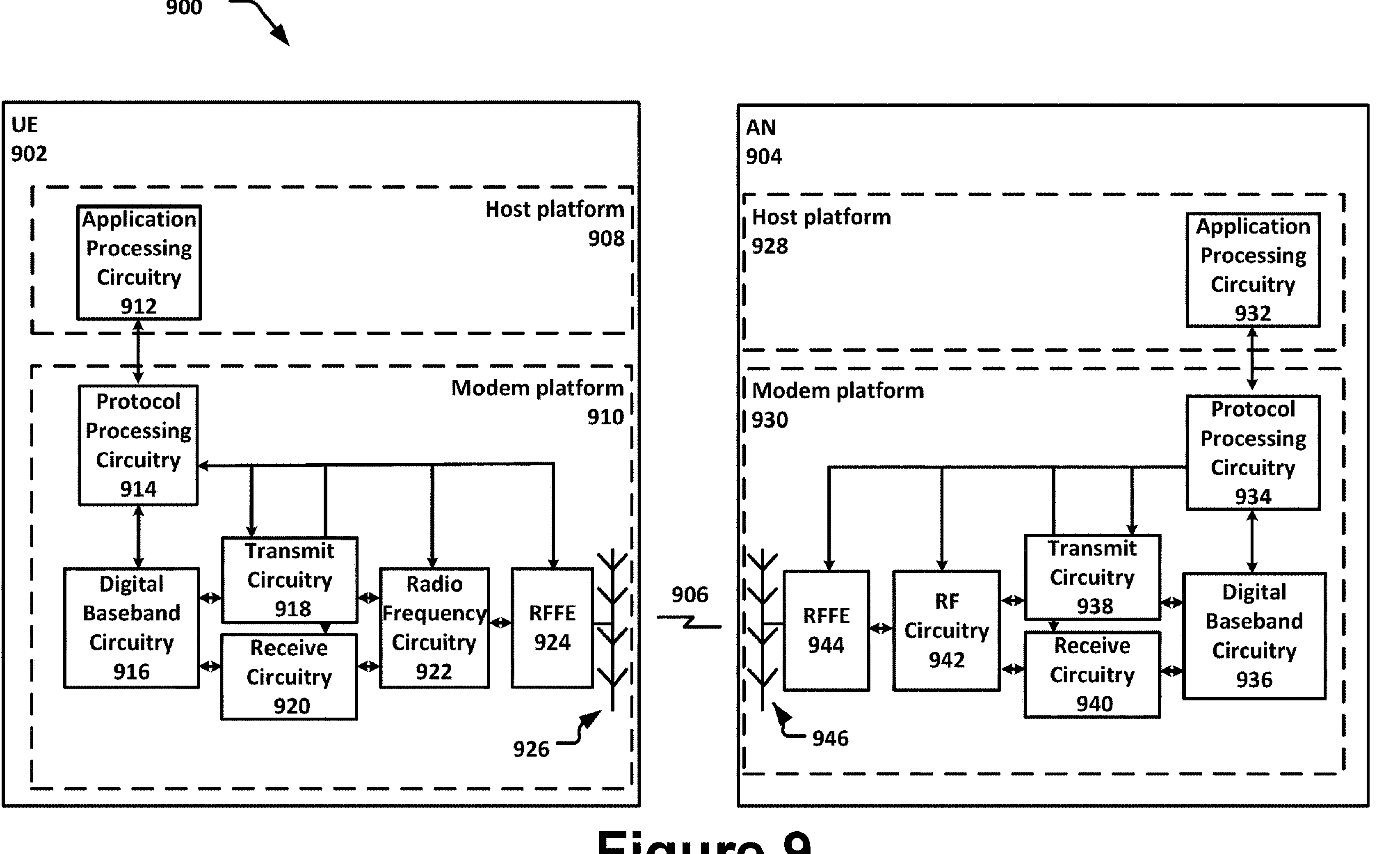
FIG. 9 schematically illustrates components of a wireless network in accordance with various embodiments.
Figure 10:
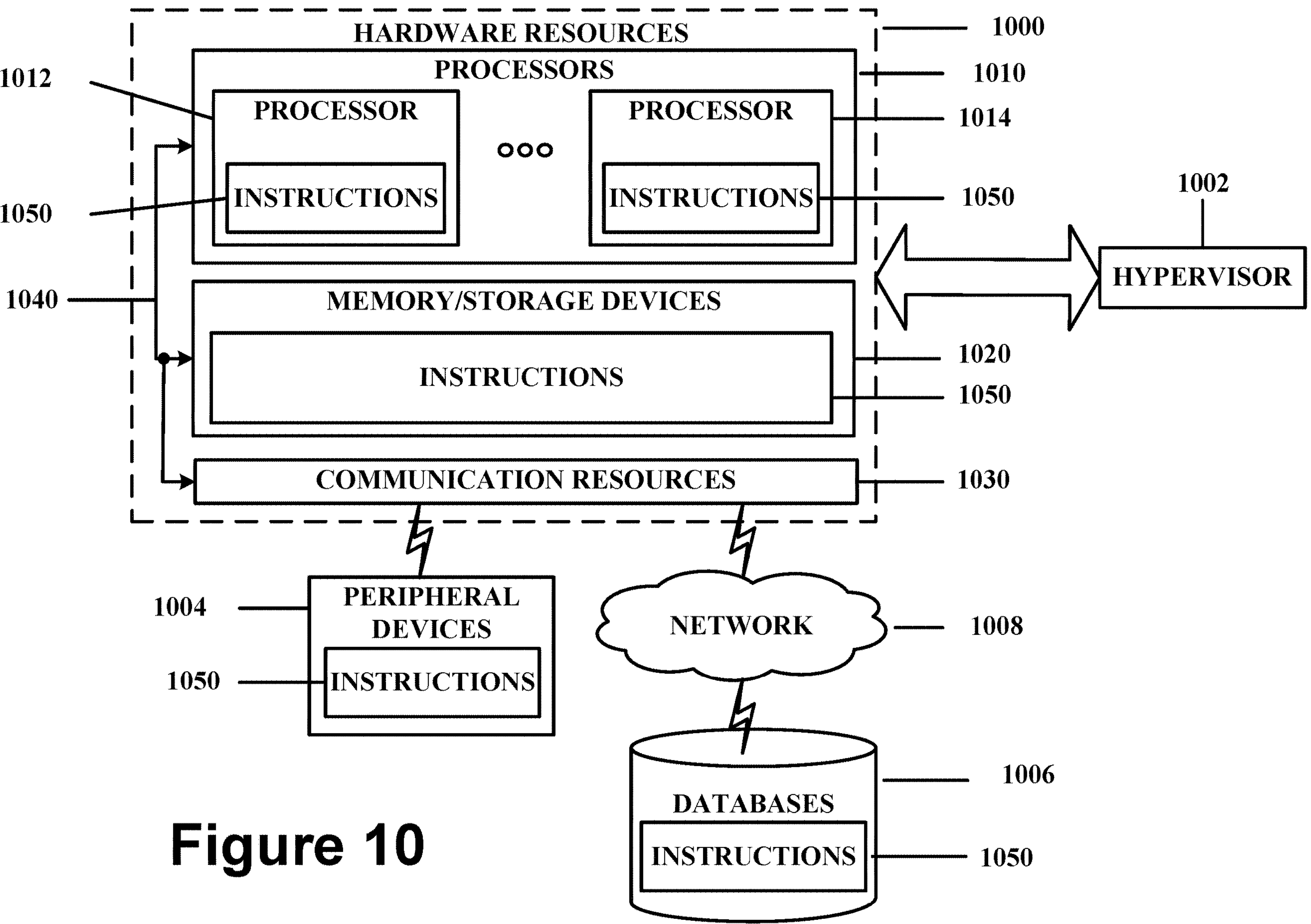
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 8-10 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3$^{rd}$ party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

Figure 11:
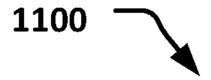
FIG. 11 depicts an example procedure for practicing the various embodiments discussed herein.

In some embodiments, the electronic device(s), network(s), system(s), chip(s) or component(s), or portions or implementations thereof, of FIGS. 8-10, or some other figure herein, may be configured to perform one or more processes, techniques, or methods as described herein, or portions thereof. One such process 1100 is depicted in FIG. 11. The process 1100 may be performed by a UE or a portion thereof. At 1102, the process 1100 may include receiving an allocation of slots for transmission of a transport block over multiple slots, wherein the transport block corresponds to a physical uplink shared channel (PUSCH) transmission. At 1104, the process 1100 may further include performing bit interleaving of the transport block within individual slots of the allocated slots. For example, to perform the bit interleaving, the UE may divide coded bits from individual code blocks of the transport block into multiple segments based on a number of the allocated slots, and apply the bit interleaving for each segment.

Figure 12:
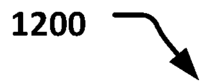
FIG. 12 depicts another example procedure for practicing the various embodiments discussed herein.

FIG. 12 illustrates another process 1200 in accordance with various embodiments. The process 1200 may be performed by a gNB or a portion thereof. At 1202, the process 1200 may include allocating slots for a user equipment (UE) to transmit a transport block over multiple slots, wherein the transport block corresponds to a physical uplink shared channel (PUSCH) transmission. At 1204, the process 1200 may further include receiving the transport block in the allocated slots, wherein coded bits of the transport block are interleaved within individual slots of the allocated slots.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include one or more computer-readable media (CRM) having instructions, stored thereon, that when executed by one or more processors of a user equipment (UE) configure the UE to: receive an allocation of slots for transmission of a transport block over multiple slots, wherein the transport block corresponds to a physical uplink shared channel (PUSCH) transmission; and perform bit interleaving of the transport block within individual slots of the allocated slots.

Example A2 may include the one or more CRM of example A1, wherein, to perform the bit interleaving, the UE is to: divide coded bits from individual code blocks of the transport block into multiple segments based on a number of the allocated slots; and apply the bit interleaving for each segment.

Example A3 may include the one or more CRM of example A2, wherein the instructions, when executed, are further to configure the UE to concatenate the segments for different code blocks and map the concatenated segments into each of the allocated slots.

Example A4 may include the one or more CRM of example A1, wherein a starting position of coded bits for bit selection for each slot is pre-determined in accordance with the number of the allocated slots and a rate-matching size of the PUSCH transmission.

Example A5 may include the one or more CRM of example A4, wherein the PUSCH transmission is dropped in one or more of the allocated slots.

Example A6 may include the one or more CRM of example A5, wherein the PUSCH transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

Example A7 may include the one or more CRM of example A1, wherein the instructions, when executed, are further to configure the UE to perform rate matching for code blocks of the transport block in the allocated slots.

Example A8 may include the one or more CRM of any of examples A1-A7, wherein the instructions, when executed, are further to configure the UE to multiplex semi-static uplink control information (UCI) with the transport block in the allocated slots.

Example A9 may include the one or more CRM of example A8, wherein coded bits are continuously mapped to resources of the allocated slots or wherein a starting position of coded bits in each slot is determined based on a predetermined starting position.

Example A10 may include the one or more CRM of example A8, wherein the UCI is multiplexed in a slot of the allocated slots that overlaps with a physical uplink control channel (PUCCH).

Example A11 may include one or more computer-readable media (CRM) having instructions, stored thereon, that when executed by one or more processors of a next generation Node B (gNB) configure the gNB to: allocate slots for a user equipment (UE) to transmit a transport block over multiple slots, wherein the transport block corresponds to a physical uplink shared channel (PUSCH) transmission; and receive the transport block in the allocated slots, wherein coded bits of the transport block are interleaved within individual slots of the allocated slots.

Example A12 may include the one or more CRM of example A11, wherein the coded bits from individual code blocks of the transport block are divided into multiple segments based on a number of the allocated slots, and wherein the segments are interleaved within the individual slots.

Example A13 may include the one or more CRM of example A11, wherein a starting position of coded bits for bit selection for each slot is pre-determined in accordance with the number of the allocated slots and a rate-matching size of the PUSCH transmission.

Example A14 may include the one or more CRM of example A13, wherein the PUSCH transmission is dropped in one or more of the allocated slots.

Example A15 may include the one or more CRM of example A14, wherein the PUSCH transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

Example A16 may include the one or more CRM of example A11, wherein code blocks of the transport block are rate matched in the allocated slots.

Example A17 may include the one or more CRM of any of examples A11-A16, wherein the instructions, when executed, are further to configure the gNB to decide uplink control information that is multiplexed with the transport block in the allocated slots.

Example A18 may include the one or more CRM of example A17, wherein coded bits are continuously mapped to resources of the allocated slots or wherein a starting position of coded bits in each slot is determined based on a predetermined starting position.

Example A19 may include the one or more CRM of example A17, wherein the UCI is multiplexed in a slot of the allocated slots that overlaps with a physical uplink control channel (PUCCH).

Example A20 may include an apparatus to be implemented in a user equipment (UE), the apparatus comprising: an interface to receive a transport block for transmission over multiple slots; and processor circuitry coupled to the interface. The processor circuitry is to: divide coded bits from individual code blocks of the transport block into multiple segments based on a number of slots allocated for transmission of the transport block; and encode the transport block for transmission with the segments from different code blocks interleaved into individual slots of the allocated slots.

Example A21 may include the apparatus of example A20, wherein the transmission is dropped in one or more of the allocated slots, and wherein a starting position of coded bits for each slot is determined based on the number of the allocated slots and a rate-matching size of the PUSCH transmission.

Example A22 may include the apparatus of example A21, wherein the transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

Example A23 may include the apparatus of example A20, wherein the processor circuitry is further to multiplex semi-static uplink control information (UCI) with the transport block in the allocated slots.

Example A24 may include the apparatus of any of examples A20-A23, wherein the transport block is a physical uplink shared channel (PUSCH) transport block.

Example B1 may include a method of wireless communication for a fifth generation (5G) or new radio (NR) system, the method comprising performing, by a UE, an interleaving and rate-matching based on a slot or all slots allocated for TB processing over multiple slots (TBoMS) for a physical uplink shared channel (PUSCH) transmission.

Example B2 may include the method of example B1 or some other example herein, wherein the coded bits for each code block are first divided into multiple segments based on the number of slots allocated for TBoMS transmission; wherein interleaving is applied for each code block segment.

Example B3 may include the method of example B1 or some other example herein, wherein if more than one code blocks are carried by TBoMS transmission, code block segments for different code blocks are concatenated and mapped into each slot allocated for TBoMS transmission.

Example B4 may include the method of example B1 or some other example herein, wherein starting position of coded bits for bit selection for each slot is pre-determined in circular buffer of each code block; wherein the starting position is determined in accordance with the number of slots allocated for TBoMS transmission and size of rate-matching output.

Example B5 may include the method of example B1 or some other example herein, wherein the starting position for the encoded bits in each slot for TBoMS transmission depends on the number of coded bits that are selected for previous slots.

Example B6 may include the method of example B1 or some other example herein, wherein when some or part of encoded bits are dropped in a slot, the starting position for the next slot is determined based on the number of rate-matched bits in the slot.

Example B7 may include the method of example B1 or some other example herein, wherein when TBoMS transmission in a slot is dropped due to collision with UL/DL configured indicated by dynamic slot format indication (SFI), uplink cancellation indication (CI), or higher priority uplink transmission, the starting position of the coded bits in each slot for TBoMS transmission is pre-determined based on the number of allocated slots and rate-matching size of TBoMS transmission.

Example B8 may include the method of example B1 or some other example herein, wherein bit interleaving is performed per all slots allocated for the TBoMS with code blocks mapping to each slot.

Example B9 may include the method of example B1 or some other example herein, wherein the encoded bits for each code block are firstly interleaved; wherein the rate-matched sequence for each code block is divided into multiple segments in each slot; wherein after concatenation of the corresponding parts of all code blocks, the resulting sequence is mapped to corresponding slot.

Example B10 may include the method of example B1 or some other example herein, wherein the encoded bits for each code block are firstly interleaved; wherein the rate-matched sequences of all code blocks are continuously concatenated; wherein after division of concatenated bits into multiple segments in each slot, the resulting sequence is mapped to corresponding slot.

Example B11 may include the method of example B1 or some other example herein, wherein when semi-static UCI is multiplexed on a TBoMS transmission without an associated DCI, the coded bits are continuously mapped to the allocated resource for TBoMS transmission.

Example B12 may include the method of example B1 or some other example herein, wherein when semi-static UCI is multiplexed on a TBoMS transmission without an associated DCI, and/or when the UCI is multiplexed on the TBoMS transmission in the first allocated slot, the coded bits are continuously mapped to the allocated resource for TBoMS transmission.

Example B13 may include the method of example B1 or some other example herein, wherein when semi-static UCI is multiplexed on a TBoMS transmission with an associated DCI, or when dynamic UCI is multiplexed on a TBoMS transmission with and without an associated DCI, starting position of coded bits in each slot is determined based on predefined starting position as mentioned above.

Example B14 may include the method of example B1 or some other example herein, wherein when semi-static UCI is multiplexed on a TBoMS transmission with an associated DCI, or when dynamic UCI is multiplexed on a TBoMS transmission with and without an associated DCI, and when the UCI is multiplexed on the TBoMS transmission in the first allocated slot, the coded bits are continuously mapped to the allocated resource for TBoMS transmission Example B15 may include a method of a UE, the method comprising: receiving an allocation of slots for processing of a transport block over multiple slots, wherein the transport block corresponds to a physical uplink shared channel (PUSCH) transmission; and performing interleaving and rate-matching for code blocks of the transport block in the allocated slots.

Example B16 may include the method of example B15 or some other example herein, further comprising dividing coded bits in the individual code blocks into multiple segments based on the number of allocated slots, wherein the interleaving is applied for each segment.

Example B17 may include the method of example B15-B16 or some other example herein, wherein code block segments for different code blocks are concatenated and mapped into each of the allocated slots.

Example B18 may include the method of example B15-B17 or some other example herein, wherein a starting position of coded bits for bit selection for each slot is pre-determined in circular buffer of each code block; wherein the starting position is determined in accordance with the number of the allocated slots and a size of rate-matching output.

Example B19 may include the method of example B15-B18 or some other example herein, further comprising multiplexing semi-static UCI with the transport block, wherein coded bits are continuously mapped to resources of the allocated slots.

Example B20 may include the method of example B19 or some other example herein, wherein the transmission of the transport block does not have an associated DCI.

Example B21 may include the method of example B19-B20 or some other example herein, wherein the UCI is multiplexed in an earliest allocated slot of the allocated slots.

Example B22 may include the method of example 15-18 or some other example herein, further comprising multiplexing UCI with the transport block, wherein a starting position of coded bits in each slot is determined based on a pre-defined starting position.

Example B23 may include the method of example B19, B21, B22, or some other example herein, wherein the UCI is semi-static UCI and the transmission has an associated DCI.

Example B24 may include the method of example B19, B21, B22, or some other example herein, wherein the UCI is dynamic UCI.

Example Z01 may include an apparatus comprising means to perform one or more elements of a method described in or related to any of examples A1-A24, B1-B24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A24, B1-B24, or any other method or process described herein.

Example Z03 may include an apparatus comprising logic, modules, or circuitry to perform one or more elements of a method described in or related to any of examples A1-A24, B1-B24, or any other method or process described herein.

Example Z04 may include a method, technique, or process as described in or related to any of examples A1-A24, B1-B24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A24, B1-B24, or portions thereof.

Example Z06 may include a signal as described in or related to any of examples A1-A24, B1-B24, or portions or parts thereof.

Example Z07 may include a datagram, packet, frame, segment, protocol data unit (PDU), or message as described in or related to any of examples A1-A24, B1-B24, or portions or parts thereof, or otherwise described in the present disclosure.

Example Z08 may include a signal encoded with data as described in or related to any of examples A1-A24, B1-B24, or portions or parts thereof, or otherwise described in the present disclosure.

Example Z09 may include a signal encoded with a datagram, packet, frame, segment, protocol data unit (PDU), or message as described in or related to any of examples A1-A24, B1-B24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A24, B1-B24, or portions thereof.

Example Z11 may include a computer program comprising instructions, wherein execution of the program by a processing element is to cause the processing element to carry out the method, techniques, or process as described in or related to any of examples A1-A24, B1-B24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |

-continued

| | |
|---|---|
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |

-continued

| | |
|---|---|
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |

-continued

| | |
|---|---|
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |

-continued

| | |
|---|---|
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |

-continued

| | |
|---|---|
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |

-continued

| | |
|---|---|
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |

-continued

| | |
|---|---|
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |

-continued

| | |
|---|---|
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| | LAN Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |

-continued

| | |
|---|---|
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |

-continued

| | |
|---|---|
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, |
| MCH | Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |

-continued

| | |
|---|---|
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |

-continued

| | |
|---|---|
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |

-continued

| | |
|---|---|
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |

-continued

| | |
|---|---|
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |

-continued

| | |
|---|---|
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |

-continued

| | |
|---|---|
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |

-continued

| | |
|---|---|
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |

-continued

| | |
|---|---|
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |

-continued

| | |
|---|---|
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:

receive an allocation of slots for transmission of a transport block over multiple slots, wherein the transport block corresponds to a physical uplink shared channel (PUSCH) transmission; and perform bit interleaving of the transport block within each individual slot of the multiple that are allocated for transmission of the transport block, wherein for performing the bit interleaving, a starting position of coded bits for bit selection for each slot is based on a number of the allocated slots and a rate-matching size of the PUSCH transmission.

2. The one or more NTCRM of claim 1, wherein, to perform the bit interleaving, the UE is to:

divide the coded bits from individual code blocks of the transport block into multiple segments based on a number of the allocated slots; and apply the bit interleaving for each segment.

3. The one or more NTCRM of claim 2, wherein the instructions, when executed, are further to configure the UE to concatenate the segments for different code blocks and map the concatenated segments into each of the allocated slots.

4. The one or more NTCRM of claim 1, wherein the PUSCH transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

5. The one or more NTCRM of claim 1, wherein the instructions, when executed, are further to configure the UE to perform rate matching for code blocks of the transport block in the allocated slots.

6. The one or more NTCRM of claim 1, wherein the instructions, when executed, are further to configure the UE to multiplex semi-static uplink control information (UCI) with the transport block in the allocated slots.

7. One or more non-transitory computer-readable media (NTCRM) having instructions, stored thereon, that when executed by one or more processors of a next generation Node B (gNB) configure the gNB to:

allocate slots for a user equipment (UE) to transmit a transport block over multiple slots, wherein the transport block corresponds to a physical uplink shared channel (PUSCH) transmission; and receive the transport block in the allocated slots, wherein coded bits of the transport block are interleaved within individual slot of the multiple that are allocated for transmission of the transport block, such that a starting position of the coded bits for bit selection for each slot is based on a number of the allocated slots and a rate-matching size of the PUSCH transmission.

8. The one or more NTCRM of claim 7, wherein the coded bits from individual code blocks of the transport block are divided into multiple segments based on a number of the allocated slots, and wherein the segments are interleaved within the individual slots.

9. The one or more NTCRM of claim 7, wherein the PUSCH transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

10. The one or more NTCRM of claim 7, wherein code blocks of the transport block are rate matched in the allocated slots.

11. The one or more NTCRM of claim 7, wherein the instructions, when executed, are further to configure the gNB to decide uplink control information that is multiplexed with the transport block in the allocated slots.

12. The one or more NTCRM of claim 11, wherein the UCI semi-static uplink control information (UCI) is multiplexed in a slot of the allocated slots that overlaps with a physical uplink control channel (PUCCH).

13. An apparatus to be implemented in a user equipment (UE), the apparatus comprising:

an interface to receive a transport block for a physical uplink shared channel (PUSCH) transmission over multiple slots; and processor circuitry coupled to the interface, the processor circuitry to:

divide coded bits from individual code blocks of the transport block into multiple segments based on a number of slots allocated for transmission of the transport block;

perform bit interleaving of the transport block within each individual slot of the multiple slots, wherein for the bit interleaving, a starting position of the coded bits for bit selection for each slot is based on a number of the allocated slots and a rate-matching size of the PUSCH transmission, and encode the transport block for transmission with the segments from different code blocks interleaved into individual slots of the allocated slots.

14. The apparatus of claim 13, wherein the transmission is dropped in one or more of the allocated slots.

15. The apparatus of claim 14, wherein the transmission is dropped in one or more of the allocated slots based on a collision with a semi-static time-division duplexing (TDD) uplink (UL)/downlink (DL) configuration, a dynamic slot format indication (SFI), an uplink cancellation indication (CI), or a higher priority uplink transmission.

16. The apparatus of claim 13, wherein the processor circuitry is further to multiplex semi-static uplink control information (UCI) with the transport block in the allocated slots.

* * * * *